(12) United States Patent
Deng et al.

(10) Patent No.: US 12,737,530 B2
(45) Date of Patent: Sep. 15, 2026

(54) SYSTEM AND METHOD USING GLOBAL AND LOCAL-AWARE DENOISING FRAMEWORK FOR COMMONSENSE KNOWLEDGE GRAPH NOISE DETECTION

(71) Applicant: The Hong Kong University of Science and Technology, Hong Kong (CN)

(72) Inventors: Zheye Deng, Hong Kong (CN); Weiqi Wang, Hong Kong (CN); Zhaowei Wang, Hong Kong (CN); Yangqiu Song, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 220 days.

(21) Appl. No.: 18/885,775

(22) Filed: Sep. 16, 2024

(65) Prior Publication Data

US 2025/0117572 A1 Apr. 10, 2025

Related U.S. Application Data

(60) Provisional application No. 63/588,299, filed on Oct. 6, 2023.

(51) Int. Cl.
*G06F 40/157* (2020.01)
*G06F 40/30* (2020.01)

(52) U.S. Cl.
CPC ............ *G06F 40/157* (2020.01); *G06F 40/30* (2020.01)

(58) Field of Classification Search
CPC ............................... G06F 40/157; G06F 40/30
See application file for complete search history.

(56) References Cited

U.S. PATENT DOCUMENTS 9,251,228 B1 * 2/2016 Iyer ..................... G06F 16/9577
11,693,896 B2 7/2023 Mihindukulasooriya et al.
(Continued)

FOREIGN PATENT DOCUMENTS

CN 114860945 A 8/2022
CN 115587583 A 1/2023

OTHER PUBLICATIONS

Bo An et al., "Accurate Text-Enhanced Knowledge Graph Representation Learning," Proceedings of NAACL-HLT 2018, Association for Computational Linguistics, 2018, p. 745-755.
(Continued)

*Primary Examiner* — Asher D Kells
(74) *Attorney, Agent, or Firm* — Idea Intellectual Limited; Sam T. Yip

(57) ABSTRACT

A system using global and local-aware denoising framework for commonsense knowledge graph noise detection is provided. The system includes an input receiver, a triple encoder, a global noise detector, a local noise detector, and a comprehensive evaluation scorer. The triple encoder receives the CSKG information from the input receiver and extract semantic information from free-text formatted nodes in the CSKG information, so as to obtain structured triples. The global noise detector identifies high-frequency patterns through rule mining and uses a rule encoder to generalize learned rules and guide noise detection. The local noise detector utilizes the structured triples output by the triple encoder to aggregate neighboring triple information around both the head and tail nodes via graph networks. The comprehensive evaluation scorer provides a comprehensive score based on global noise detection and local noise detection, so as to indicate a noise level for the CSKG information.

16 Claims, 11 Drawing Sheets

(56) References Cited

U.S. PATENT DOCUMENTS

| | | | |
|---|---|---|---|
| 11,714,832 | B2 | 8/2023 | Cervantes et al. |
| 2020/0097861 | A1* | 3/2020 | Mihindukulasooriya .................... G06F 16/367 |
| 2022/0179857 | A1 | 6/2022 | Kompella et al. |

OTHER PUBLICATIONS

Molood Barati et al., "Mining semantic association rules from RDF data," Knowledge-Based Systems, ScienceDirect, 2017, vol. 133, p. 183-196.
Caleb Belth et al., "What is Normal, What is Strange, and What is Missing in a Knowledge Graph: Unified Characterization via Inductive Summarization," WWW '20, IW3C2, ACM, 2020.
Chandra Bhagavatula et al., "Abductive Commonsense Reasoning," ICLR 2020, arXiv: 1908.05739v2 2020, p. 1-18.
Yonatan Bisk et al., "PIQA: Reasoning about Physical Commonsense in Natural Language," The Thirty-Fourth AAAI Conference on Artificial Intelligence (AAAI-20), Association for the Advancement of Artificial Intelligence, 2020, p. 7432-7439.
Antoine Bordes et al., "Translating Embeddings for Modeling Multi-relational Data," NIPS'13: Proceedings of the 26th International Conference on Neural Information Processing Systems, ACM Digital Library, 2013, vol. 2, p. 2787-2795.
Antoine Bosselut et al., "Dynamic Neuro-Symbolic Knowledge Graph Construction for Zero-Shot Commonsense Question Answering," The Thirty-Fifth AAAI Conference on Artificial Intelligence (AAAI-21), Association for the Advancement of Artificial Intelligence, 2021, p. 4923-4931.
Antoine Bosselut et al., "COMET: Commonsense Transformers for Automatic Knowledge Graph Construction," Proceedings of the 57th Annual Meeting of the Association for Computational Linguistics, Association for Computational Linguistics, 2019, p. 4762-4779.
Tom B. Brown et al., "Language Models are Few-Shot Learners," arXiv: 2005.14165v4, 2020, p. 1-75.
Jiangjie Chen et al., "Say What You Mean! Large Language Models Speak Too Positively about Negative Commonsense Knowledge," Proceedings of the 61st Annual Meeting of the Association for Computational Linguistics, Association for Computational Linguistics, 2023, vol. 1, p. 9890-9908.
Kewei Cheng et al., "Neural Compositional Rule Learning for Knowledge Graph Reasoning," ICLR 2023, arXiv: 2303.03581v1, 2023, p. 1-18.
Kewei Cheng et al., "RLogic: Recursive Logical Rule Learning from Knowledge Graphs," KDD '22, ACM, 2022.
Ernest Davis et al., "Commonsense Reasoning and Commonsense Knowledge in Artificial Intelligence," Communications of the ACM, 2015, vol. 58(9), p. 92-103.
Tianqing Fang et al., "Benchmarking Commonsense Knowledge Base Population with an Effective Evaluation Dataset," Proceedings of the 2021 Conference on Empirical Methods in Natural Language Processing, Association for Computational Linguistics, 2021, p. 8949-8964.
Tianqing Fang et al., "DISCOS: Bridging the Gap between Discourse Knowledge and Commonsense Knowledge," WWW'21, IW3C2, ACM, 2021.
Luis Galárraga et al., "Fast rule mining in ontological knowledge bases with AMIE+," The VLDB Journal, 2015, vol. 24, p. 707-730.
Luis Galárraga et al., "AMIE: Association Rule Mining under Incomplete Evidence in Ontological Knowledge Bases," WWW'13, IW3C2, ACM, 2013.
Congcong Ge et al., "KGClean: An Embedding Powered Knowledge Graph Cleaning Framework," arXiv: 2004.14478v1, 2020.
Shu Guo et al., "Jointly Embedding Knowledge Graphs and Logical Rules," Proceedings of the 2016 Conference on Empirical Methods in Natural Language Processing, Association for Computational Linguistics, 2016, p. 192-202.
Shu Guo et al., "Knowledge Graph Embedding with Iterative Guidance from Soft Rules," The Thirty-Second AAAI Conference on Artificial Intelligence (AAAI-18), Association for the Advancement of Artificial Intelligence, 2018, p. 4816-4823.
Xu Han et al., "OpenKE: An Open Toolkit for Knowledge Embedding," Proceedings of the 2018 Conference on Empirical Methods in Natural Language Processing (System Demonstrations), Association for Computational Linguistics, 2018, p. 139-144.
Mutian He et al., "Acquiring and Modelling Abstract Commonsense Knowledge via Conceptualization," Artificial Intelligence, ScienceDirect, 2024, vol. 333, 104149, p. 1-36.
Pengcheng He et al., "DEBERTAV3: Improving Deberta Using Electra-Style Pre-Training With Gradientdisentangled Embedding Sharing," ICLR 2023, arXiv: 2111.09543v4, 2023, p. 1-16.
Shengbin Jia et al., "Triple Trustworthiness Measurement for Knowledge Graph." WWW '19, IW3C2, ACM, 2019, p. 2865-2871.
Yu Jin Kim et al., "Modularized Transfer Learning with Multiple Knowledge Graphs for Zero-shot Commonsense Reasoning," Proceedings of the 2022 Conference of the North American Chapter of the Association for Computational Linguistics: Human Language Technologies, Association for Computational Linguistics, 2022, p. 2244-2257.
Diederik P. Kingma et al., "ADAM: a Method for Stochastic Optimization," ICLR 2015, arXiv: 1412.6980v5, 2015, p. 1-13.
Jonathan Lajus et al., "Fast and Exact Rule Mining with AMIE 3," ESWC 2020, LNCS, 2020, vol. 12123, p. 36-52.
Xiang Li et al., "Commonsense Knowledge Base Completion," Proceedings of the 54th Annual Meeting of the Association for Computational Linguistics, Association for Computational Linguistics, 2016, p. 1445-1455.
Yankai Lin et al., "Modeling Relation Paths for Representation Learning of Knowledge Bases," Proceedings of the 2015 Conference on Empirical Methods in Natural Language Processing, Association for Computational Linguistics, 2015, p. 705-714.
H. Liu et al., "ConceptNet—a practical commonsense reasoning tool-kit," BT Technology Journal, 2004, vol. 22(4), p. 211-226.
Rui Liu et al., "Enhancing Zero-shot and Few-shot Stance Detection with Commonsense Knowledge Graph," Findings of the Association for Computational Linguistics: ACL-IJCNLP 2021, Association for Computational Linguistics, 2021, p. 3152-3157.
Yinhan Liu et al., "ROBERTa: A Robustly Optimized BERT Pretraining Approach," arXiv: 1907.11692v1, 2019.
Kaixin Ma et al., "Knowledge-driven Data Construction for Zero-shot Evaluation in Commonsense Question Answering," The Thirty-Fifth AAAI Conference on Artificial Intelligence (AAAI-21), Association for the Advancement of Artificial Intelligence, 2021, p. 13507-13515.
Chaitanya Malaviya et al., "Commonsense Knowledge Base Completion with Structural and Semantic Context," The Thirty-Fourth AAAI Conference on Artificial Intelligence (AAAI-20), Association for the Advancement of Artificial Intelligence, 2020, p. 2925-2933.
Elan Markowitz et al., "StATIK: Structure and Text for Inductive Knowledge Graph Completion," Findings of the Association for Computational Linguistics: NAACL 2022, Association for Computational Linguistics, 2022, p. 604-615.
Nasrin Mostafazadeh et al., "GLUCOSE: Generalized and Contextualized Story Explanations," Proceedings of the 2020 Conference on Empirical Methods in Natural Language Processing, Association for Computational Linguistics, 2020, p. 4569-4586.
Stephen Muggleton et al., "Inductive Logic Programming: Theory and Methods," The Journal of Logic Programming, 1994, vol. 19-20, p. 629-679.
Jianmo Ni et al., "Sentence-T5 (ST5): Scalable Sentence Encoders from Pre-trained Text-to-Text Models," Findings of the Association for Computational Linguistics: ACL 2022, Association for Computational Linguistics, 2022, p. 1864-1874.
Openai, "ChatGPT: Optimizing Language Models for Dialogue" URL: https://chatgpt.r4wand.eu.org/ Downloaded on Nov. 11, 2024.
Long Ouyang et al., "Training language models to follow instructions with human feedback," NIPS'22: Proceedings of the 36th International Conference on Neural Information Processing Systems, ACM Digital Library, 2022, No. 2011, p. 27730-27744.

(56) References Cited

OTHER PUBLICATIONS

Meng Qu et al., "Rnnlogic: Learning Logic Rules for Reasoning on Knowledge Graphs," ICLR 2021, arXiv: 2010.04029v2, 2021, p. 1-21.
Julien Romero et al., "Mapping and Cleaning Open Commonsense Knowledge Bases with Generative Translation," International Semantic Web Conference 2023 (ISWC), HAL open science, 2023, p. 368-387.
Ali Sadeghian et al., "DRUM: End-To-End Differentiable Rule Mining on Knowledge Graphs," Proceedings of the 33rd International Conference on Neural Information Processing Systems, ACM Digital Library, 2019, No. 1375, p. 15347-15357.
Tara Safavi et al., "NEGATER: Unsupervised Discovery of Negatives in Commonsense Knowledge Bases," Proceedings of the 2021 Conference on Empirical Methods in Natural Language Processing, Association for Computational Linguistics, 2021, p. 5633-5646.
Keisuke Sakaguchi et al., "WinoGrande: An Adversarial Winograd Schema Challenge at Scale," Communications of the ACM, 2021, vol. 64(9), p. 99-106.
Maarten Sap et al., "ATOMIC: An Atlas of Machine Commonsense for If-Then Reasoning," The Thirty-Third AAAI Conference on Artificial Intelligence (AAAI-19), Association for the Advancement of Artificial Intelligence, 2019, p. 3027-3035.
Maarten Sap et al., "SOCIAL IQA: Commonsense Reasoning about Social Interactions," Proceedings of the 2019 Conference on Empirical Methods in Natural Language Processing and the 9th International Joint Conference on Natural Language Processing, Association for Computational Linguistics, 2019, p. 4463-4473.
Mike Schuster et al., "Bidirectional Recurrent Neural Networks," IEEE Transactions on Signal Processing, IEEE, 1997, vol. 45(11), p. 2673-2681.
Jianhao Shen et al., "Joint Language Semantic and Structure Embedding for Knowledge Graph Completion," Proceedings of the 29th International Conference on Computational Linguistics, 2022, p. 1965-1978.
Vered Shwartz et al., "Unsupervised Commonsense Question Answering with Self-Talk," Proceedings of the 2020 Conference on Empirical Methods in Natural Language Processing, Association for Computational Linguistics, 2020, p. 4615-4629.
Robyn Speer et al., "ConceptNet 5.5: An Open Multilingual Graph of General Knowledge," Proceedings of the Thirty-First AAA! Conference on Artificial Intelligence (AAAI-17), Association for the Advancement of Artificial Intelligence, 2017, p. 4444-4451.
Ying Su et al., "MICO: A Multi-alternative Contrastive Learning Framework for Commonsense Knowledge Representation," Findings of the Association for Computational Linguistics: EMNLP 2022, Association for Computational Linguistics, 2022, p. 1339-1351.
Zhiqing Sun et al., "Rotate: Knowledge Graph Embedding by Relational Rotation in Complex Space," ICLR 2019, arXiv: 1902.10197v1, 2019. P. 1-18.
Alon Talmor et al., "Commonsenseqa: A Question Answering Challenge Targeting Commonsense Knowledge," Proceedings of NAACL-HLT 2019, Association for Computational Linguistics, 2019, p. 4149-4158.
Niket Tandon et al., "Acquiring Comparative Commonsense Knowledge from the Web," Proceedings of the Twenty-Eighth AAAI Conference on Artificial Intelligence, Association for the Advancement of Artificial Intelligence, 2014, p. 166-172.
Niket Tandon et al., "WebChild 2.0: Fine-Grained Commonsense Knowledge Distillation," Proceedings of the 55th Annual Meeting of the Association for Computational Linguistics-System Demonstrations, Association for Computational Linguistics, 2017, p. 115-120.
Théo Trouillon et al., "Complex Embeddings for Simple Link Prediction," Proceedings of the 33rd International Conference on Machine Learning, JMLR: W&CP, 2016, vol. 48.
Petar Veličković et al., "Graph Attention Networks," ICLR 2018, arXiv: 1710.10903v3, 2018, p. 1-12.
Bin Wang et al., "Inductive Learning on Commonsense Knowledge Graph Completion," 2021 International Joint Conference on Neural Networks (IJCNN), IEEE, 2021.
Bo Wang et al., "Structure-Augmented Text Representation Learning for Efficient Knowledge Graph Completion," WWWW'21, IW3C2, ACM, 2021, p. 1737-1748.
Weiqi Wang et al., "CAR: Conceptualization-Augmented Reasoner for Zero-Shot Commonsense Question Answering," Findings of the Association for Computational Linguistics: EMNLP 2023, Association for Computational Linguistics, 2023, p. 13520-13545.
Zhigang Wang et al., "Text-Enhanced Representation Learning for Knowledge Graph," Proceedings of the Twenty-Fifth International Joint Conference on Artificial Intelligence (IJCAI-16), ACM Digital Library, 2016, p. 1293-1299.
Jason Wei et al., "Chain of Thought Prompting Elicits Reasoning in Large Language Models," arXiv: 2201.11903v1, 2022.
Peter West et al., "Symbolic Knowledge Distillation: from General Language Models to Commonsense Models," Proceedings of the 2022 Conference of the North American Chapter of the Association for Computational Linguistics: Human Language Technologies, Association for Computational Linguistics, 2022, p. 4602-4625.
Thomas Wolf et al., "Transformers: State-of-the-Art Natural Language Processing," Proceedings of the 2020 EMNLP (Systems Demonstrations), Association for Computational Linguistics, 2020, p. 38-45.
Ruobing Xie et al., "Does William Shakespeare REALLY Write Hamlet? Knowledge Representation Learning with Confidence," The Thirty-Second AAAI Conference on Artificial Intelligence (AAAI-18), Association for the Advancement of Artificial Intelligence, 2018, p. 4954-4961.
Bishan Yang et al., "Embedding Entities and Relations for Learning and Inference in Knowledge Bases," ICLR 2015, arXiv: 1412.6575v4, 2015, p. 1-12.
Fan Yang et al., "Differentiable Learning of Logical Rules for Knowledge Base Reasoning," NIPS'17: Proceeding of the 31st Conference on Neural Information Processing Systems, ACM Digital Library, 2017, p. 2316-2325.
Liang Yao et al., "KG-BERT: BERT for Knowledge Graph Completion," Association for the Advancement of Artificial Intelligence, arXiv: 1909.03193v2, 2019.
Michihiro Yasunaga et al., "Deep Bidirectional Language-Knowledge Graph Pretraining," 36th Conference on Neural Information Processing Systems (NeurIPS 2022), arXiv: 2210.09338v2, 2022, p. 1-19.
Changlong Yu et al., "FolkScope: Intention Knowledge Graph Construction for Discovering E-commerce Commonsense," arXiv: 2211.08316v1, 2022.
Hengtong Zhang et al., "Data Poisoning Attack against Knowledge Graph Embedding." Proceedings of the Twenty-Eighth International Joint Conference on Artificial Intelligence (IJCAI-19), 2019, p. 4853-4859.
Hongming Zhang et al., "ASER: Towards Large-scale Commonsense Knowledge Acquisition via Higher-order Selectional Preference over Eventualities," Artificial Intelligence, ScienceDirect, 2022, vol. 309, 103740, p. 1-43.
Houyu Zhang et al., "Grounded Conversation Generation as Guided Traverses in Commonsense Knowledge Graphs," Proceedings of the 58th Annual Meeting of the Association for Computational Linguistics, Association for Computational Linguistics, 2020, p. 2031-2043.
Qinggang Zhang et al., "Contrastive Knowledge Graph Error Detection," CIKM '22, Association for Computing Machinery, ACM, 2022.
Wen Zhang et al., "Iteratively Learning Embeddings and Rules for Knowledge Graph Reasoning," WWW '19, IW3C2, ACM, 2019.
Jiangtao Ma et al., "PTrustE: A high-accuracy knowledge graph noise detection method based on path trustworthiness and triple embedding," Knowledge-Based Systems, ScienceDirect, 2022, vol. 256, 109688, p. 1-14.

* cited by examiner

| Model | ConceptNet N5 | | ConceptNet N10 | | ConceptNet N20 | | ATOMIC N5 | | ATOMIC N10 | | ATOMIC N20 | |
|---|---|---|---|---|---|---|---|---|---|---|---|---|
| | R@5 | AUC | R@10 | AUC | R@20 | AUC | R@5 | AUC | R@10 | AUC | R@20 | AUC |
| TransE | .084 | .679 | .163 | .670 | .276 | .665 | .390 | .849 | .475 | .849 | .569 | .853 |
| DistMult | .118 | .656 | .187 | .652 | .283 | .653 | .425 | .841 | .490 | .835 | .551 | .840 |
| ComplEx | .160 | .733 | .248 | .720 | .364 | .718 | .460 | .842 | .531 | .841 | .581 | .839 |
| RotatE | .114 | .614 | .177 | .609 | .262 | .604 | .140 | .738 | .212 | .732 | .311 | .728 |
| CKRL | .150 | .693 | .231 | .701 | .342 | .694 | .317 | .787 | .411 | .795 | .497 | .794 |
| CAGED | .474 | .903 | .536 | .883 | .620 | .877 | .577 | .914 | .630 | .910 | .674 | .896 |
| KG-BERT | .601 | .925 | .680 | .936 | .750 | .939 | .714 | .936 | .782 | .953 | .813 | .951 |
| LASS (BERT-base) | .640 | .955 | .706 | .955 | .768 | .951 | .762 | .956 | .791 | .956 | .821 | .955 |
| LASS (BERT-large) | .689 | .959 | .750 | .963 | .804 | .961 | .757 | .957 | .792 | .957 | .827 | .957 |
| LASS (RoBERTa-base) | .665 | .961 | .709 | .958 | .775 | .955 | .775 | .961 | .802 | .960 | .831 | .959 |
| LASS (RoBERTa-large) | .730 | .971 | .785 | .973 | .831 | .971 | .780 | .964 | .814 | .964 | .844 | .963 |
| GOLD (RoBERTa-base) | .831 | .982 | .847 | .980 | .866 | .974 | .861 | .964 | .880 | .965 | .887 | .958 |
| GOLD (RoBERTa-large) | .828 | .985 | .841 | .978 | .868 | .977 | .864 | .968 | .880 | .962 | .900 | .968 |
| GOLD (DeBERTa-v3-base) | .839 | .979 | **.861** | .980 | .875 | .975 | .862 | .965 | .873 | **.967** | .884 | .959 |
| GOLD (DeBERTa-v3-large) | .823 | .973 | .850 | .975 | .863 | .968 | .849 | .962 | .863 | .958 | .880 | .961 |
| GOLD (Sentence-T5-base) | .838 | .983 | .852 | .981 | .870 | .975 | .863 | .959 | **.890** | .964 | .896 | .958 |
| GOLD (Sentence-T5-xl) | .822 | .982 | .836 | .979 | .858 | .973 | .862 | .960 | .880 | .962 | .891 | .960 |
| GOLD (Sentence-T5-xxl) | **.842** | **.985** | .859 | **.981** | **.878** | **.979** | **.872** | **.969** | .887 | .966 | **.901** | **.974** |

TABLE 1

FIG. 3

| Model | Recall@$k$ | AUC |
|---|---|---|
| GOLD (Sent-T5-xxl) | 0.859 | 0.981 |
| w/o LM | 0.810(↓ 5.7%) | 0.968(↓ 1.3%) |
| w/o $E_{global}$ | 0.826(↓ 3.8%) | 0.971(↓ 1.0%) |
| w/o $E_{local}$ | 0.599(↓ 30.1%) | 0.925(↓ 5.7%) |

TABLE 2

FIG. 4

| Model | Recall@$k$ | AUC |
|---|---|---|
| GOLD (Sentence-T5-xxl) | 0.869 | 0.982 |
| GPT-3.5 (text-davinci-003) | 0.273 | 0.685 |
| ChatGPT (gpt-3.5-turbo) | 0.263 | 0.734 |

TABLE 3

FIG. 6

| Denoising | aNLI | CSQA | PIQA | SIQA | WG | Avg. |
|---|---|---|---|---|---|---|
| N/A | **74.0** | 65.4 | 73.8 | **59.5** | **73.9** | 69.3 |
| LASS | 71.8 | 65.8 | 77.7 | 57.4 | 67.3 | 68.0 |
| GOLD | 72.2 | **69.6** | **79.0** | 58.8 | 71.5 | **70.3** |

TABLE 4

FIG. 7

| Dataset | Nodes | Relations | Original Triples | Noisy Triples | Avg. Degree | Avg. Words |
|---|---|---|---|---|---|---|
| ConceptNet-N5<br>ConceptNet-N10<br>ConceptNet-N20 | 78,339 | 34 | 102,400 | 5,120<br>10,240<br>20,480 | 1.31 | 2.85 |
| ATOMIC-N5<br>ATOMIC-N10<br>ATOMIC-N20 | 304,439 | 9 | 762,230 | 39,297<br>78,595<br>157,190 | 2.50 | 4.47 |

TABLE 5

FIG. 8

| Type | Head | Relation | Tail |
|---|---|---|---|
| Replacing $h$ with $\hat{h}$ | *playground equipment*<br>*John has trouble falling asleep* | `UsedFor`<br>`xIntent` | *temporary residence*<br>*to make more money* |
| Replacing $r$ with $\hat{r}$ | *hotel room*<br>*John works long hours* | `NotCapableOf`<br>`oEffect` | *temporary residence*<br>*to make more money* |
| Replacing $t$ with $\hat{t}$ | *hotel room*<br>*John works long hours* | `UsedFor`<br>`xIntent` | *prepare food to eat*<br>*lose money or resources* |
| New Triple | *plastic fork*<br>*John drinks coffee* | `CapableOf`<br>`oEffect` | *buy food*<br>*to go to the movie theatre* |

TABLE 6

FIG. 9

Algorithm 1 Merge Sort guided by ChatGPT

Input: A triple list $L$
Output: A tiple list sorted from high to low according to the noise level
Function: MERGESORT($L$)

1: $h \leftarrow |L|/2$
2: $L_{left} \leftarrow$ MERGESORT($L[1, 2, \cdots, h]$)
3: $L_{right} \leftarrow$ MERGESORT($L[h+1, \cdots |L|]$)
4: $i \leftarrow 1$
5: $j \leftarrow 1$
6: for $k \leftarrow 1$ to $|L|$ do
7: if $i > h$ then
8: $L[k] \leftarrow L_{right}[j]$
9: $j \leftarrow j + 1$
10: else if $j > h$ then
11: $L[k] \leftarrow L_{left}[i]$
12: $i \leftarrow i + 1$
13: else if ASKCHATGPT($L_i, L_j$) $= L_i$ then
14: $L[k] \leftarrow L_{left}[i]$
15: $i \leftarrow i + 1$
16: else
17: $L[k] \leftarrow L_{right}[j]$
18: $j \leftarrow j + 1$
19: end if
20: end for
21: return $L$

FIG. 10

| **Prompt** |
| --- |
| Given two triples from a knowledge graph: $(h_1, r_1, t_1), (h_2, r_2, t_2)$. Which one is more likely to be wrong? Show me the reason first, and then print the wrong triple. You are forced to make a decision. |

TABLE 7

FIG. 11

| Model | ConceptNet N5 | | N10 | | N20 | |
|---|---|---|---|---|---|---|
| | Acc | AUC | Acc | AUC | Acc | AUC |
| GOLD (Sent-T5-xxl) | **.842** | **.985** | **.859** | **.981** | **.878** | **.979** |
| w/o PLM | .779(↓ 7.5%) | .970(↓ 1.5%) | .810(↓ 5.7%) | .968(↓ 1.3%) | .834(↓ 5.0%) | .963(↓ 1.6%) |
| w/o $E_{global}$ | .791(↓ 6.1%) | .974(↓ 1.1%) | .826(↓ 3.8%) | .971(↓ 1.0%) | .862(↓ 1.8%) | .974(↓ 0.5%) |
| w/o $E_{local}$ | .478(↓ 43.2%) | .915(↓ 7.1%) | .599(↓ 30.3%) | .925(↓ 5.7%) | .652(↓ 25.7%) | .907(↓ 7.4%) |
| w/ $E_{translation}$ | .841(↓ 0.1%) | .986(↑ 0.1%) | .856(↓ 0.4%) | .983(↑ 0.2%) | .867(↓ 1.3%) | .971(↓ 0.8%) |

| Model | ATOMIC N5 | | N10 | | N20 | |
|---|---|---|---|---|---|---|
| | Acc | AUC | Acc | AUC | Acc | AUC |
| GOLD (Sent-T5-xxl) | **.872** | **.969** | **.887** | **.966** | **.901** | **.974** |
| w/o PLM | .779(↓ 10.7%) | .927(↓ 4.3%) | .801(↓ 9.7%) | .928(↓ 3.9%) | .822(↓ 8.8%) | .929(↓ 4.6%) |
| w/o $E_{global}$ | .859(↓ 1.5%) | .960(↓ 0.9%) | .874(↓ 1.5%) | .961(↓ 0.5%) | .884(↓ 1.9%) | .955(↓ 2.0%) |
| w/o $E_{local}$ | .656(↓ 24.8%) | .931(↓ 3.9%) | .699(↓ 21.2%) | .930(↓ 3.7%) | .747(↓ 17.1%) | .926(↓ 4.9%) |
| w/ $E_{translation}$ | .868(↓ 0.5%) | .962(↓ 0.7%) | .886(↓ 0.1%) | .965(↓ 0.1%) | .901(↓ 0.0%) | .970(↓ 0.4%) |

TABLE 8

FIG. 12

| Rules |
|---|
| IsA$(x, y)$ ← IsA$(x, z_1)$ ∧ DefinedAs$(z_1, z_2)$ ∧ IsA$(z_2, y)$ |
| CapableOf$(x, y)$ ← HasA$(x, z_1)$ ∧ PartOf$(z_1, z_2)$ ∧ CapableOf$(z_2, y)$ |
| NotDesires$(x, y)$ ← DefinedAs$(x, z_1)$ ∧ CreatedBy$(z_1, z_2)$ ∧ NotDesires$(z_2, y)$ |
| HasPrerequisite$(x, y)$ ← HasPrerequisite$(x, z_1)$ ∧ MadeOf$(z_1, z_2)$ ∧ HasPrerequisite$(z_2, y)$ |

TABLE 9

FIG. 13

| Head | Relation | Tail |
|---|---|---|
| *X is a good friend with Y* | isAfter | *X is a little weird* |
| *X refuses to take a pen* | oEffect | *are glad to see X* |
| *X steals Y's breakfast* | oNeed | *to leave X's room* |
| *X catches a stranger* | isAfter | *X checks the weather forecast* |
| *X flies to Washington* | oEffect | *become a politician* |
| *X falls down again* | isAfter | *X's mother gives X a hug* |
| *X seems to stay well* | oWant | *to see X get sick* |
| *X assumes that Y is a nice person* | isAfter | *Y has done something that upsets X* |
| *X studies hard for his exam* | oNeed | *to cheat on the exam* |
| *X is afraid of getting in trouble* | oNeed | *to tell X that he or she could get in trouble* |

TABLE 10

FIG. 14

SYSTEM AND METHOD USING GLOBAL AND LOCAL-AWARE DENOISING FRAMEWORK FOR COMMONSENSE KNOWLEDGE GRAPH NOISE DETECTION

TECHNICAL FIELD

The present invention relates to machine learning (ML) technologies; and in particularly to systems and methods using global and local-aware denoising framework for commonsense knowledge graph noise detection.

BACKGROUND

Recently, the emergence of Commonsense Knowledge Graphs (CSKGs) has significantly impacted the field of commonsense reasoning as CSKGs provide commonsense knowledge that is often not explicitly stated in the text and difficult for machines to capture systematically. While existing methods bank on expensive and time-consuming crowd-sourcing to collect commonsense knowledge, it remains infeasible to obtain CSKGs that are large enough to cover numerous entities and situations in the world. To overcome this limitation, various automatic CSKG construction methods have been proposed to acquire commonsense knowledge at scale, including prompting Large Language Models (LLM), rule mining from massive corpora, and knowledge graph population. Although those methods are effective, they still suffer from noises introduced by construction bias and the lack of human supervision.

To tackle this issue, noise detection algorithms have been proposed for conventional entity-based KGs by primarily adopting two approaches: learning-based and rule-based. Learning-based methods, according to some related works, learn representations of entities and relations that adhere to specific relation compositions like translation assumption or relational rotation. To enhance their performance, researchers also incorporate local information around the head and tail entities, such as different paths from head to tail and neighboring triples. These methods aim to improve their ability to capture the complex relationships between entities in KGs. However, they are not easily adaptable to the unique characteristics of CSKGs. In CSKGs, nodes are non-canonicalized, free-form text, meaning nodes with different descriptions may have related semantics.

FIG. 1 shows a subgraph of CSKG with some instances of noise. As the illustration, "paint door" and "paint house" are two distinct nodes but imply related semantics. Additionally, when detecting noise (e.g., paint, UsedFor, brush your teeth), "brush your teeth" is an isolated node that cannot be distinguished based on any structural information. Only through the power of a language model can it be learned that "paint" and "brush your teeth" are uncorrelated, thus detecting such noise. The aforementioned methods overlook this semantic information and cannot generalize to semantically similar events with diverse structural information.

On the other hand, rule-based methods utilize logical rules in KGs for noise detection. For instance, as shown in illustration of FIG. 1, the correct relation between "painter" and "paint house" should be CapableOf. This can be easily detected through the learned logical rule: CapableOf(x, y)←CapableOf(x,z)∧HasPrerequisite (y, z). Some related works similarly propose an approach based on information theory that extracts sub-graph patterns to identify the noise. However, the sparsity of edges in CSKGs posits a serious challenge to learning structural information well, as the number of learnable rules decreases significantly. This requires a generalizable rule-learning ability at the noise detector side to expand the rule bank accordingly, which is currently lacking. Therefore, applying noise detection models for KGs directly to CSKGs can result in incomplete learning of both semantic and structural information in the CSKGs.

Aside from specifically designed noise-detection methods, the line of works targeting KG completion can also be transferred to tackle noise-detection tasks. Previous research has shown that PLMs can achieve outstanding performance on KG completion tasks for both conventional KGs and CSKGs due to their ability to capture linguistic patterns and semantic information. However, two limitations still exist. First, performing edge classification using a PLM requires optimizing a large number of parameters on textual data that has been transformed from edges in CSKGs. Such fine-tuning is not only computationally expensive but also incapable of learning structural features in graphs, which are essential for accurately identifying and classifying edges. Second, recent studies have shown that language models, regardless of their scale, struggle to acquire implicit negative knowledge through costly language modelling. This makes them potentially vulnerable to noise detection tasks, as these noises typically belong to negative knowledge.

Therefore, there is a need for more sophisticated manipulations of the semantic information extracted by PLMs to leverage them for noise detection tasks efficiently.

SUMMARY OF INVENTION

In order to detect noises in CSKGs effectively, it is important to consider both the semantic information and the global and local structural information jointly. However, these factors have not been given enough importance in existing language models and denoising approaches. To address this gap, an approach of Global and Local-aware Denoising, called GOLD, is proposed, a CSKG noise detector that uses a PLM-based triple encoder and two noise detectors that take into account both global and local structures. Specifically, the triple encoder extracts the semantic information contained in the free-text formatted nodes in CSKGs. To identify correct patterns, the global detector uses high-frequency patterns extracted through rule mining, which intrinsically uses a rule encoder to generalize the learned rules and guide noise detection. The local detector adopts a graph neural network to efficiently measure the similarity of aggregated semantic information of neighboring triples of the head and tail nodes to help detect noise.

Also, extensive experiments on two manually synthesized noisy-CSKG benchmarks demonstrate the efficacy of GOLD, which outperforms all existing methods and LLM, such as GPT-3.5 and ChatGPT. Further experiments and analyses with ATOMIC$^{10X}$, a large-scale CSKG distilled from GPT-3, demonstrate that GOLD successfully detects noises in real-world CSKGs and such denoising extrinsically benefits downstream zero-shot commonsense question-answering task.

In accordance with a first aspect of the present invention, a system using global and local-aware denoising framework for commonsense knowledge graph noise detection. The system includes an input receiver, a triple encoder, a global noise detector, a local noise detector, and a comprehensive evaluation scorer. The input receiver serves as a user interface responsible for receiving user inputs and is configured to process the user inputs to obtain commonsense knowledge graph (CSKG) information. The triple encoder is configured to receive the CSKG information from the input receiver and extract semantic information from free-text formatted nodes in the CSKG information, so as to obtain structured triples. The global noise detector receives the structured triples output from the triple encoder and is configured to analyze and detect noise at a global level from the CSKG information. The global noise detector identifies high-frequency patterns through rule mining and uses a rule encoder to generalize learned rules and guide noise detection. The local noise detector receives the structured triples output from the triple encoder and is configured to analyze and detect noise at a local level from the CSKG information. The local noise detector utilizes the structured triples output by the triple encoder to aggregate neighboring triple information around both the head and tail nodes via graph networks. The comprehensive evaluation scorer is configured to provide a comprehensive score based on global noise detection and local noise detection from the global noise detector and the local noise detector, respectively, so as to indicate a noise level for the CSKG information.

In accordance with a second aspect of the present invention, a method using global and local-aware denoising framework for commonsense knowledge graph noise detection is provided. The method includes steps as follows: receiving, by an input receiver serving as a user interface, user inputs to process the user inputs, so as to obtain CSKG information; receiving, by a triple encoder, the CSKG information from the input receiver; extracting, by the triple encoder, semantic information from free-text formatted nodes in the CSKG information, so as to obtain structured triples; receiving, by a global noise detector, the structured triples output from the triple encoder; analyzing and detecting, by the global noise detector, noise at a global level from the CSKG information, wherein the global noise detector identifies high-frequency patterns through rule mining and uses a rule encoder to generalize learned rules and guide noise detection; receiving, by a local noise detector, the structured triples output from the triple encoder; analyzing and detecting, by the local noise detector, noise at a local level from the CSKG information, wherein the local noise detector utilizes the structured triples output by the triple encoder to aggregate neighboring triple information around both the head and tail nodes via graph networks; providing, by a comprehensive evaluation scorer, a comprehensive score based on global noise detection and local noise detection from the global noise detector and the local noise detector, respectively, so as to indicate a noise level for the CSKG information.

BRIEF DESCRIPTION OF DRAWINGS

Embodiments of the invention are described in more details hereinafter with reference to the drawings, in which:

FIG. 3 shows Table 1 which demonstrates the model performance on the six datasets in the noise detection task;

FIG. 4 shows Table 2 which demonstrates a comparison of the performance using different approaches;

FIG. 6 shows Table 3 which demonstrates performance comparison on a randomly sampled ConceptNet-N10 dataset;

FIG. 7 shows Table 4 which demonstrates zero-shot evaluation results (%) on five benchmarks for QA models;

FIG. 8 shows Table 5 which demonstrates statistical information for six datasets;

FIG. 9 shows Table 6 which provides examples of four manually generated types of noise;

FIG. 10 shows Algorithm 1 for sorting the triples in descending order of their noise level;

FIG. 11 shows Table 7 which demonstrates the prompt used for comparing which of the two triples is more likely to be noise;

FIG. 12 shows Table 8 which demonstrates results of experiments conducted on the six datasets;

FIG. 13 shows Table 9 which demonstrates the most frequent rules mined from the ConceptNet-N10 dataset using AMIE 3;

FIG. 14 shows Table 10 which demonstrates ten specific examples that violate reasonability.

DETAILED DESCRIPTION OF THE INVENTION

Figure 1:
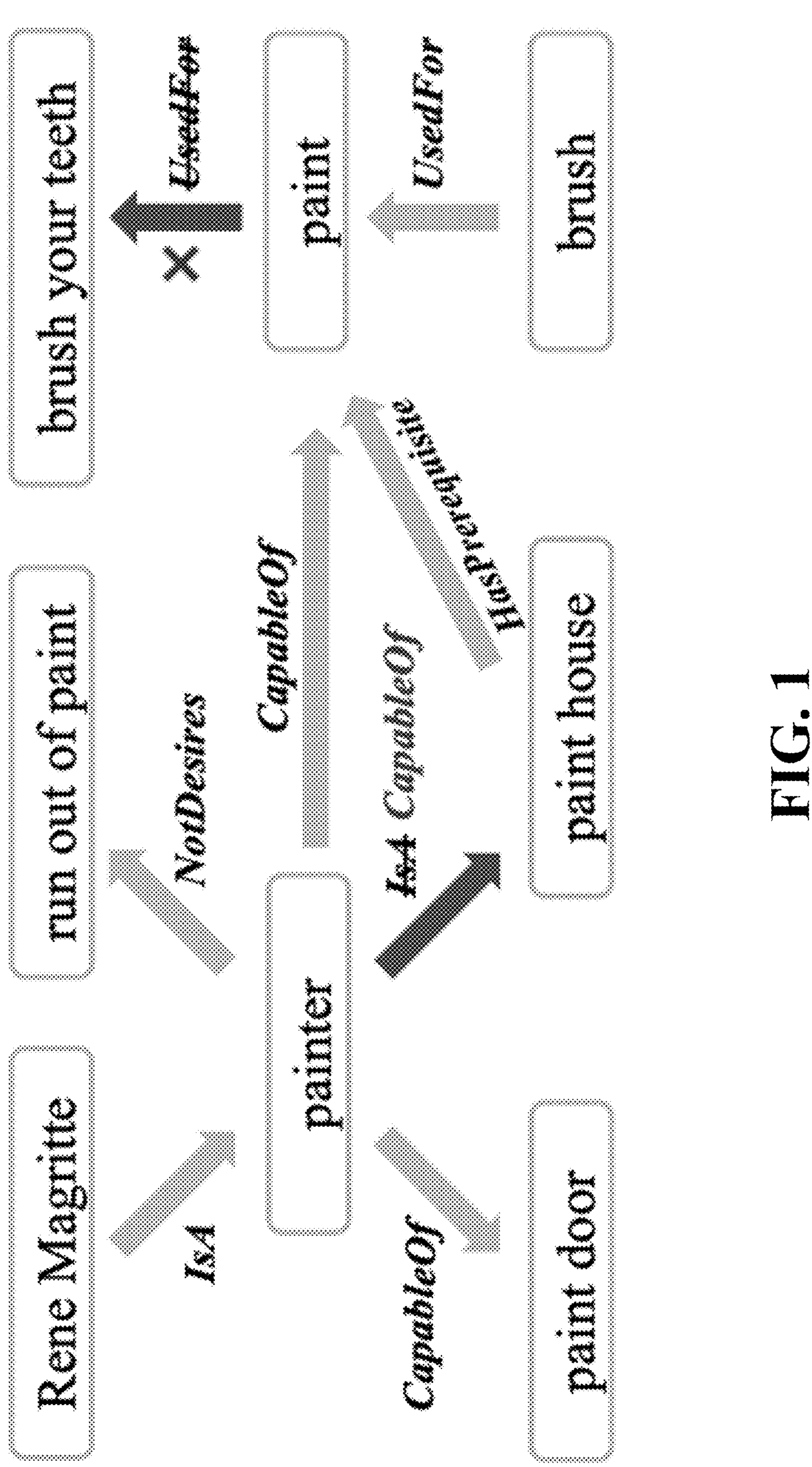
FIG. 1 shows a subgraph of CSKG with some instances of noise.

In the following description, systems and methods using global and local-aware denoising framework for commonsense knowledge graph noise detection and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Commonsense Knowledge Graphs (CSKGs) are crucial for commonsense reasoning, yet constructing them through human annotations can be costly. As a result, various automatic methods have been proposed to construct CSKG with larger semantic coverage. However, these unsupervised approaches introduce spurious noise that can lower the quality of the resulting CSKG, which cannot be tackled easily by existing denoising algorithms due to the unique characteristics of nodes and structures in CSKGs.

In the present disclosure, to address this issue, an approach of Global and Local-aware Denoising, called GOLD, is proposed; it is a denoising framework for CSKGs that incorporates entity semantic information, global rules, and local structural information from the CSKG. Also, experiment results demonstrate that GOLD outperforms all baseline methods in noise detection tasks on synthetic noisy CSKG benchmarks. Furthermore, the present disclosure shows that denoising a real-world CSKG is effective and even benefits the downstream zero-shot commonsense question-answering task.

To make the descriptions of the present disclosure easier to understand, a section of the related work is provided first as follows.

Related Work—Knowledge Graph Noise Detection

Many existing knowledge graph noise detection approaches utilize some local information while simultaneously training embeddings to satisfy the relational assumption. Path information is the most commonly used type of local information, as the reachable path from the head entity to the tail entity has been proven crucial for noise detection in knowledge graphs. Some studies show that contrastive learning between the information of neighboring triples of the head and tail entities is more effective because of the triple-level contrasting instead of entity or graph-level, leading to superior performance compared to all path-based methods. Clustering methods are also used to partition noise from triples, and an active learning-based classification model is proposed to detect and repair dirty data.

While these methods consider local information, the proposed approach of the present invention also accounts for semantic information and the global information of the knowledge graph to guide noise detection, better mitigating the impact of noise on local information. Regarding direct noise detection in CSKGs, some works study the problem of mapping the open KB into the structured schema of an existing one, while our methods only use the CSKG to be denoised itself, not relying on any other CSKG.

Related Work—Knowledge Graph Rule Mining

Another related line of work is knowledge graph rule mining, which plays an essential role in the proposed method of the present invention. This task has received great attention in knowledge graph completion. The first category of methods is Inductive Logical Programming (ILP), which uses inductive and logical reasoning to learn rules. On the other hand, AMIE proposes a method of association rule mining, which explores frequently occurring patterns in the knowledge graph to extract rules and counts the number of instances supporting the discovered rules and their confidence scores. AMIE+ and AMIE 3 further improve upon this method by introducing several pruning optimizations, allowing them to scale well to large knowledge graphs. SWARM also introduces a statistical method for rule mining in large-scale knowledge graphs that focuses on both instance-level and schema-level patterns. However, it requires type information of entities, which is not available in the CSKG and, therefore, cannot be applied to CSKG.

Recently, with the success of deep learning, the idea of ILP has been neutralized, resulting in a series of neural-symbolic methods. Neural LP and DRUM both propose end-to-end differentiable models for learning first-order logical rules for knowledge graph reasoning. Despite the great success achieved by the combination of Recurrent Neural Network (RNN) with rule mining, neutralized methods are intuitively hard to interpret due to the confidence scores output by neural networks. Furthermore, jointly learning rules and embedding has been proven to be effective, and iteratively learning between them can also promote the effectiveness of both. For noise detection in knowledge graphs, one related study provides learning of higher-order patterns based on subgraphs to help refine knowledge graphs, but it requires type information of nodes and hence cannot be applied to the CSKG.

Task Definition—Prior to the descriptions for the proposed GOLD method, task definition is provided.

A CSKG can be represented as $G=(V, R, \varepsilon)$, where V is a set of nodes, R is a set of relations, and $\varepsilon \subseteq V \times R \times V$ is a set of triples or edges. Given a triple $(h, r, t) \in \varepsilon$ in a CSKG, the language descriptions of h, r, and t are concatenated and it is to determine whether this description conforms to commonsense. The details of the definition of noise in CSKG are presented in Appendix A-part. It is noted that each triple violates commonsense to a different degree, and define noise detection is defined as a ranking problem to standardize the evaluation process better. Thus, noise detection is modelled as a ranking process where a scoring function $f:\varepsilon \rightarrow \mathbb{R}$ indicates the likelihood of the triple being noisy.

The GOLD Method

Figure 2:
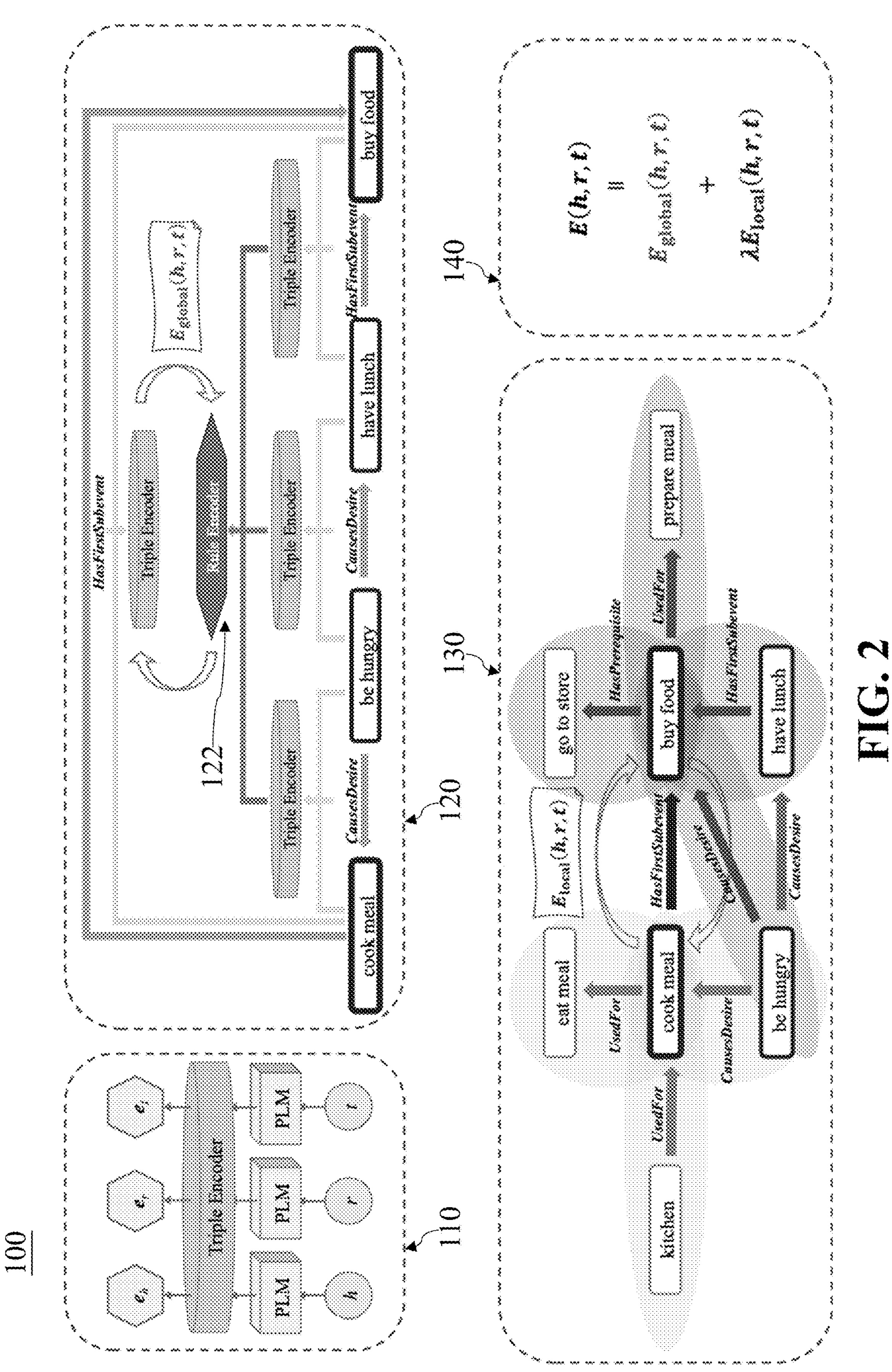
FIG. 2 shows a schematic diagram for an overview of a GOLD framework according to some embodiments of the present invention.

FIG. 2 shows a schematic diagram for an overview of a GOLD framework according to some embodiments of the present invention. The example in the illustration of FIG. 2 shows how to examine the noise level of the triple (cook meal, HasFirstSubevent, buy food) from both global and local perspectives. The rule HasFirstSubevent $(x, y) \leftarrow$ CausesDesire $(z_1, x)$ $\wedge$CausesDesire $(z_1, z_2)$ $\wedge$HasFirstSubevent $(z_2, y)$, which is learned from the entire CSKG, provides guidance for noise detection, while the neighboring triples of "cook meal" and "buy food" are used for aggregation as features for local structure learning.

According to some embodiments of the present invention, the proposed method GOLD is executed by a system 100 including four components: a triple encoder 110, a global noise detector 120, a local noise detector 130, and a comprehensive evaluation scorer 140.

In this regard, the first is to leverage a PLM to encode the natural language descriptions of nodes and relations in CSKGs to obtain their sentence embeddings via the triple encoder 110, thus further encoding the triples. When detecting noise, the likelihood of a triple being noise is evaluated from both a global and local perspective, via the global noise detector 120 and the local noise detector 130, respectively. From the global perspective, the aim is to identify high-frequency patterns in the knowledge graph via the global noise detector 120, as a small amount of noise is less likely to affect correct high-frequency patterns. To accomplish this, rule mining is employed to extract high-quality rules from the knowledge graph. From the local perspective, graph networks are adopted to aggregate the neighboring triple information around both the head and tail nodes of a given edge via the local noise detector 130, allowing for an estimation of any correlation. Finally, based on these two aspects of detection, a comprehensive score indicating the noise level is obtained using the comprehensive evaluation scorer 140.

Triple Encoder 110

As afore-mentioned, the nodes in CSKG are linguistic descriptions that are not restricted to any specific canonicalized form. If their semantic information is ignored, it will inevitably affect the accuracy of noise detection. Therefore, the triple encoder (TE) 110 is configured to employ a PLM to encode the semantics of each node and relation. For instance, considering an example of triple (h, r, t), their embeddings are defined as:

$$s_h = LM(h),\ s_r = LM(r),\ s_t = LM(t) \quad (1)$$

where LM is a frozen PLM that maps the input text to an embedding. To strike a balance between capturing the relationship between h, r, and t and maintaining model efficiency, an efficient RNN is opted as the encoding method for the CSKG triples:

$$e_h,\ e_r,\ e_t = RNN(s_h, s_r, s_t) \quad (2)$$

Then, they are simply concatenated together to get the representation of the triple (h, r, t):

$$TE(h, r, t) = [e_h || e_r || e_t] \tag{3}$$

Global Noise Detector 120 for Global Rule Mining

To detect noisy triples, scoring (h, r, t) only from a local perspective, such as modelling the neighbors of h and t, or analyzing the path from h to t, may not be sufficient to eliminate the interference of noisy triples, as it is difficult to determine what is noise from local structures alone. In commonsense knowledge graphs, the noise ratio should not be excessively high. Therefore, learning high-frequency patterns from a global perspective is likely to cover correct triples. In turn, patterns can guide in identifying the noise data when detecting violations.

To incorporate the global information of the entire CSKG when determining the probability of a triple being noise, the method of rule mining executed by the global noise detector 120 is used to first extract high-frequency, high-confidence, and interpretable rules from the CSKG. Taking into account both the interpretability and efficiency of the model, AMIE 3, a rule mining method based on the frequency of each pattern, is employed to generate logical rules automatically using the global noise detector 120 with the following format:

$$r_h(x, y) \leftarrow r_{b_1}(x, z_1) \wedge \ldots \wedge r_{b_k}(z_{k-1}, y) \tag{4}$$

where $r_h(x, y)$ is the rule head and $r_{b_1}(x, z_1) \wedge \ldots \wedge r_{b_k}(z_{k-1}, y)$ is the rule body, x, y, $z_1, \ldots, z_{k-1}$, are nodes, $r_h$, $r_{b_1}$, $r_{b_k}$ are relations. As depicted in Equation (4), the rule body consists of k triples:

$$t_1 = (x, b_1, z_1),\ t_2 = (z_1, b_2, z_2),\ \cdots,\ t_k = (z_k, b_k, y) \tag{5}$$

To address the issue of poor generalization of mined rules due to sparsity in edges in CSKGs, the rule body $r_b$ is considered as a sequence, and an RNN is employed as the neutralized Rule Encoder (RE) 122 to generalize the rules:

$$RE(r_b) = RNN(TE(t_1), TE(t_2), \cdots, TE(t_k)) \tag{6}$$

Specifically, for each relation as the rule head, the top $k_{rules}$ rules with the highest confidence score given by AMIE 3 are retained for training the rule encoder 122 in the global noise detector 120. In cases where there is no corresponding instance for a rule body, all triples in the rule body are filled with (x, h, y) to align the energy scores of the other triples. In one embodiment, a well-generalized rule encoder can learn a representation, which can explicitly infer the rule head $r_h$, i.e., (x, h, y). Hence, the dimensions of the outputs from TE 110 and RE 122 are aligned, and the energy function is defined as follows:

$$E_{global}(h, r, t) = \Sigma_{(r_b, r_h)} ||RE(r_b) - TE(r_h)||_2 \tag{7}$$

As such, a global energy information is obtained.

Local Noise Detector 130 for Local Neighboring Triple Learning

Structural information plays a significant role in enhancing performance for KG noise detection tasks. Most methods require that the relationship between two nodes should be equivalent to a translation between their embeddings. In the present disclosure, this restriction is relaxed and it aims to determine some level of contextual correlation between two related nodes using the local noise detector 130. As for the specific relation, the global noise detector 120 will learn its corresponding representation. In this regard, the local noise detector 130 adopts a graph neural network to efficiently measure the similarity of aggregated semantic information of neighboring triples of the head and tail nodes to help detect noise. For example, to capture the contextual semantic information of the triples around nodes, in the local triple learner 130, Graph Attention Network (GAT) is adopted to aggregate the information of the neighboring triples.

A transformation matrix $W \in \mathbb{R}^{F \times d}$ is used here to map the i-th triple $(h_i, r_i, t_i)$ to the embedding:

$$v_i = W [e_{h_i} || e_{r_i} || e_{t_i}] \tag{8}$$

where F is the dimension of the latent space and d is the embedding dimension of the triple, and perform the self-attention function a: $\mathbb{R}^F \times \mathbb{R}^F \rightarrow \mathbb{R}$ on the triples to get $w_{ij} = a(v_i, v_j)$, which indicates the context of the j-th triple to the i-th triple. To compute the attention of the neighboring triples on the head and tail nodes, respectively, the neighboring triples of the node e are defined as $N_e = \{(\tilde{h}, \tilde{r}, \tilde{t}) | \tilde{h} = e \vee \tilde{t} = e\}$, and then the softmax function is used to normalize the coefficients:

$$\alpha_{ij^{(h)}} = softmax_{j^{(h)}}(w_{ij^{(h)}}) = \frac{\exp(w_{ij^{(h)}})}{\Sigma_{k^{(h)} \in N_{h_i}} \exp(w_{ik^{(h)}})}, \tag{9}$$

$$\beta_{ij^{(t)}} = softmax_{j^{(t)}}(w_{ij^{(t)}}) = \frac{\exp(w_{ij^{(t)}})}{\Sigma_{k^{(t)} \in N_{t_i}} \exp(w_{ik^{(t)}})}$$

where $\alpha_{ij}(h)$ represents the attention of the $j^{(h)}$-th triple on node $h_i$, while $\beta_{ij}(t)$ represents the attention of the $j^{(t)}$-th triple on node $t_i$. It is worth noting that the $j^{(h)}$ triple is required to meet the condition of being a neighbor of node h, and similarly, the $j^{(h)}$-th triple must also be a neighbor of node $t_i$.

The normalized attention coefficients are used to calculate a linear combination of the corresponding embeddings, which then serves as the final output:

$$p_i = \sigma\left(\Sigma_{j^{(h)} \in N_{h_i}} \alpha_{ij^{(h)}} v_j(h)\right),\ q_i = \sigma\left(\Sigma_{j^{(t)} \in N_{t_i}} \alpha_{ij}(t) v_j(t)\right) \tag{10}$$

The Euclidean distance is simply employed between them to measure the correlation between $h_i$ and $t_i$ and to obtain the energy function of triple $(h_i, r_i, t_i)$ under local perception as follows:

$$E_{local}(h_i, r_i, t_i) = ||p_i - q_i||_2 \tag{11}$$

As such, a local energy information is obtained.

Comprehensive Evaluation Scorer 140 for Jointly Learning and Optimization

The overall energy function of each triple (h, r, t) is obtained by combining the global and local energy functions (i.e., the global and local energy information). After the combining, the obtained is:

$$E(h, r, t) = E_{global}(h, r, t) + \lambda E_{local}(h, r, t) \tag{12}$$

where λ is a hyperparameter. When doing inference, the value of E reflects the probability that this triplet is noise.

Negative sampling is used to minimize the margin-based ranking loss:

$$L = \Sigma_{i^+ \in \varepsilon} \Sigma_{i^- \in \varepsilon_{i^+}} \max(0, \gamma + E(i^+) - E(i^-)) \tag{13}$$

where $i^+$ represents a positive triple (h, r, t), and $i^-$ represents a negative triple. A set of negative examples $\varepsilon_i+$ is constructed based on $i^+$ by replacing either h or t with a random node $\tilde{e} \in V$:

$$\varepsilon_i + = \{(\tilde{e}, r, t) \mid \tilde{e} \in V\} \cup \{(h, r, \tilde{e}) \mid \tilde{e} \in V\} - \varepsilon \tag{14}$$

In the next section, Experimental Setup for evaluating the detection capability of denoising models is provided.

Experimental Setup—Datasets

To evaluate the detection capability of denoising models, a suitable method is followed to construct benchmark datasets for evaluation. This involves generating noise with manually defined sampling rules and injecting it back into the original CSKG.

In one embodiment, ConceptNet and ATOMIC are selected as two source CSKGs due to their manageable scale and diverse coverage of edge semantics, including various entities, events, and commonsense relations. Since these manually curated CSKGs do not contain noise naturally, noise is synthesized for each CSKG separately using meticulously designed rules, incorporating modifications on existing edges and random negative sampling. This approach ensures that the resulting noises not only remain highly informative, thus more challenging for the model to detect, but also stimulate several types of noise that may appear in real-world CSKGs. More details for noise synthesis are provided in Appendix B.1.

Experimental Setup—Evaluation Metrics

There are two common metrics are used to evaluate the performance of all methods:

1) Recall@k: Given that there are k noisy triples in the dataset, all triples are sorted by their score in descending order, where a higher score indicates a higher probability of being a noisy triple. Then, the top k triples are selected and the recall rate is calculated.

$$\text{Recall@}k = \frac{|\text{Noisy Triples in the top} - k \text{ list}||}{k} \tag{15}$$

2) AUC (Area Under the ROC Curve): AUC measures the probability that a model will assign a higher score to a randomly chosen noisy triple than to a randomly chosen positive triple. A higher AUC score indicates better performance.

Experimental Setup—Competing Methods

The model provided by the present invention is compared with state-of-the-art models which can be mainly divided into three categories:

(i) Structure embedding-based methods that are unaware of noise, including TransE, DistMult, ComplEx, and RotateE;

(ii) Embedding-based methods that are aware of noise, including CKRL and CAGED;

(iii) Language model-based methods that encode both semantic and structural embeddings and are unaware of noise, including KG-BERT and LASS. KGist as a rule-based method requires node type information, which is unavailable in the CSKG, making it infeasible to use as a baseline. More detailed descriptions are in Appendix B.2.

Experimental Setup—Implementation Details

Three families of PLMs from the Huggingface Library are leveraged to build our GOLD framework, including ROBERTa, DeBERTa-v3, and Sentence-T5. Detailed variants of these PLMs are included in Table 1. The proposed GOLD approach of the present disclosure is trained with an Adam optimizer, with the learning rate set to 1 e−3. The default number of training epochs is 10, with a margin γ of 5 and a rule length set to 3. Additionally, a grid search is conducted for λ, ranging from 0 to 1, to find the best hyperparameter for $k_{rules}$ from 0 to 500. Further information regarding the implementation is discussed in Appendix B.3.

Experiments and Analyses—Main Results

The performance of all models on the six datasets in the noise detection task is shown in Table 1 of FIG. 3. In this regard, Table 1 is comparison of the effectiveness of different methods. The proposed GOLD model is highlighted and outperforms all baselines across six data sets and both metrics. The best results are denoted in bold, while the best result among the competing methods is marked with an underline.

In general, noise detection using GOLD proves more accurate in CSKG, significantly outperforming all baseline methods. Unlike baseline models based on language models, whose performance is highly dependent on the model size, the proposed GOLD method consistently surpasses the baseline across different language model backbones with minimal performance variation. Specifically, when employed with the ROBERTa family of language models, the proposed GOLD method demonstrates an average accuracy improvement of 8.64% and 8.50% compared to LASS methods on the ConceptNet and ATOMIC dataset series, respectively. Among the language models utilized, the Sentence-T5-xxl model achieves the highest overall performance, with accuracy improvements exceeding 10.14% and 9.17% on the ConceptNet and ATOMIC dataset series, respectively, compared to the baseline. Additionally, the AUC score also shows improvements of 1.02% and 0.62%.

Experiments and Analyses—Ablation Study

In this section, an ablation study is conducted on the ConceptNet-N10 dataset to evaluate the contribution of each component in our proposed model. The results of this study are presented in Table 2 of FIG. 4. Table 2 shows Ablation study results comparing the performance of the proposed GOLD approach of the present disclosure with and without each component on the ConceptNet-N10 dataset. Overall, it is observed that removing any of the components led to varying degrees of performance degradation, highlighting the essentiality of each component in the proposed GOLD model.

Experiments and Analyses—Influence of Language Model

The PLM is removed from the triple encoder, and random embeddings are used instead to encode the information of nodes and relations, obtaining the embeddings $s_h$, $s_r$, $s_t$ in Equation (1). This resulted in a 5.7% decrease in the model's accuracy and a 1.3% decrease in AUC, indicating that the PLM indeed contributes to the understanding of semantic information of nodes. It is noted that even after removing the language model, the accuracy and AUC still outperforms all competing methods.

Experiments and Analyses—Influence of Global Rule Mining

Figure 5:
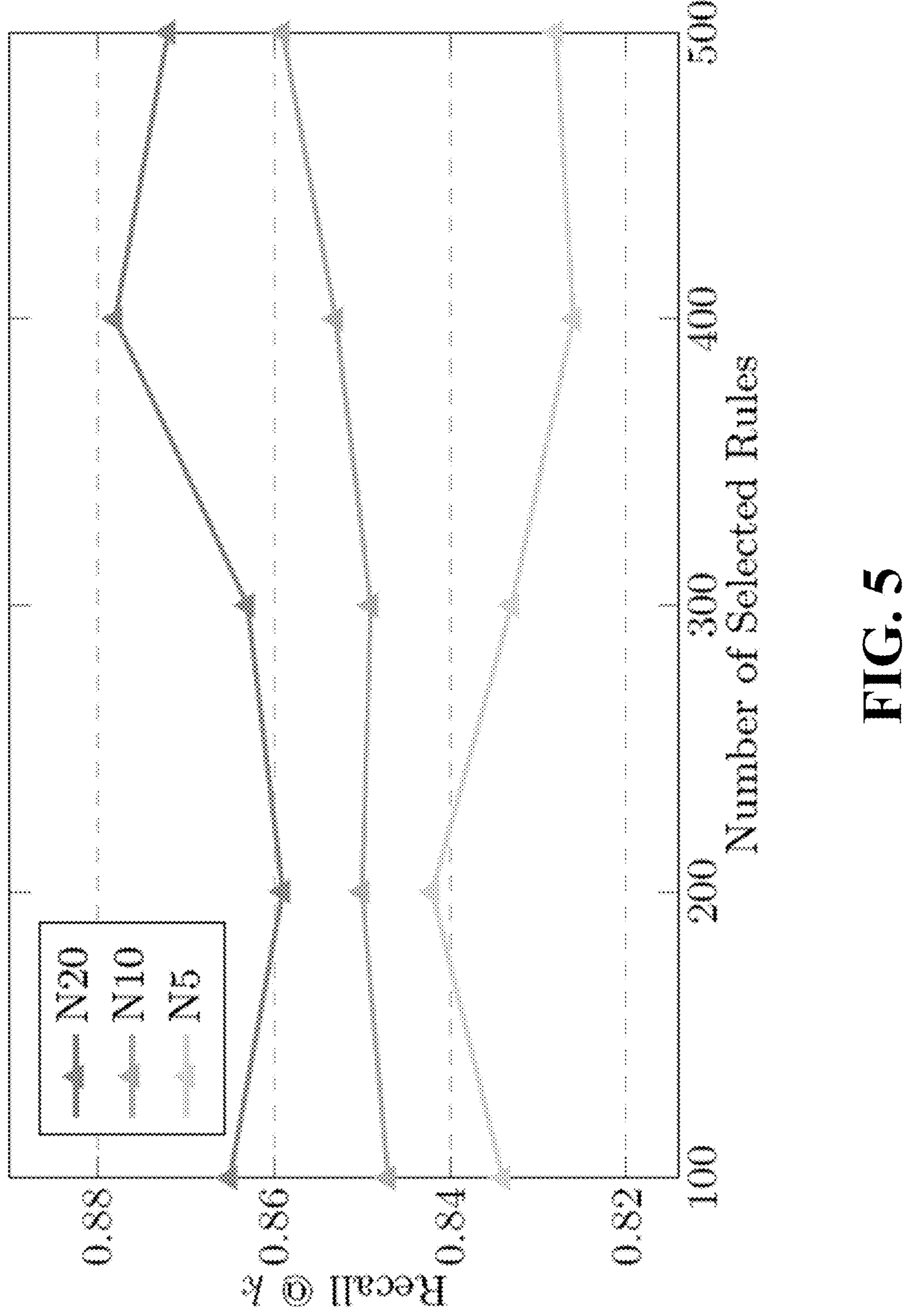
FIG. 5 shows accuracy of noise detection vs $k_{rules}$ which is the number of selected logical rules on ConceptNet series.

The global rule encoder is removed, leading to a 3.8% decrease in accuracy and a 1.0% decrease in AUC, implying the important role of the rule encoder in guiding noise detection. Furthermore, as the rule encoder is trained using the top $k_{rules}$ rules with the highest confidence score for each relation from the rules mined by AMIE 3, the impact of different values of $k_{rules}$ are tested on the accuracy using three datasets from the ConceptNet series. $k_{rules}$ is varied among {100, 200, 300, 400, 500}. FIG. 5 shows accuracy of noise detection vs $k_{rules}$ which is the number of selected logical rules on ConceptNet series. The results are shown in FIG. 5. It is observed that when the noise level is relatively low, i.e., in N5 dataset, $k_{rules}$=200 achieves the best performance, and adding more rules degraded the model's performance. However, when the noise level was high, such as in the N10 and N20 datasets, increasing the number of rules improves the model's performance to some extent. This analysis suggests that as the noise level increases, learning local information becomes more prone to being misled, hence more rules are needed to provide global guidance.

Experiments and Analyses—Influence of Local Neighbor Learning

Moreover, the local neighbor information learning component is removed, resulting in a significant decrease of 30.1% in accuracy and 5.7% in AUC, demonstrating the crucial role of neighboring triple information in noise detection. More comprehensive ablation studies are included in Appendix D.

Experiments and Analyses—Comparison with ChatGPT

Recent breakthroughs in Large Language Models (LLMs), such as GPT-3.5 and ChatGPT, have demonstrated remarkable performance across a diverse range of NLP tasks. In light of this, these LLMs are benchmarked on the defined noise detection task to establish another competitive baseline for comparison. To achieve this, 1,000 triples are selected from poisoned ConceptNet-N10 CSKG and the LLMs are tasked with ranking them iteratively by comparing two triples and merge-sorting them (more detailed information in Appendix C). This evaluation setting ensured that the LLMs followed an objective that is mostly identical to the proposed GOLD approach. The results, as shown in Table 3 of FIG. 6, which is performance comparison on a randomly sampled ConceptNet-N10 dataset. Table 3 indicates that both LLMs performed significantly poorly on the provided task, displaying a substantial gap compared to the proposed GOLD approach. One possible explanation is that these LLMs operate in a zero-shot setting and lack prior knowledge of noisy knowledge contained in CSKGs. This highlights the significance of the proposed GOLD approach, which exhibits a keen sensitivity to noise in CSKGs through fine-tuning.

Experiments and Analyses—Downstream Benefits of Denoising CSKG

The effectiveness of the proposed noise detection framework has been validated by investigating whether eliminating noise from ATOMIC10X would yield extrinsic benefits for downstream tasks, specifically zero-shot commonsense Question-Answering (QA). This task involves performing QA on commonsense benchmarks such as Abductive NLI, CommonsenseQA, PhysicalIQA, SocialIQA, and WinoGrande without accessing their respective training data. One related work proposes a technique that fine-tunes a PLM on synthetic QA pairs constructed from CSKGs, which has been proven effective. Specifically, the head node and relation of an edge are transformed into a question using natural language templates, and the tail node serves as the ground-truth answer. Distractors are tails of other edges sampled from the same CSKG whose head node does not share common keywords with the question. A PLM is then fine-tuned on such synthetic QA entries using marginal ranking loss to serve as a general QA model. To this extent, the QA synthesis protocol and model training process are kept fixed, and the role of leveraging different CSKGs is ablatively studied; in the case provided by the disclosure, raw ATOMIC$^{10X}$ and noise-cleaned ATOMIC$^{10X}$. Accuracy is used as the evaluation metric and trained three QA models separately on (1) the original ATOMIC$^{10X}$, (2) ATOMIC$^{10X}$ denoised with LASS, and (3) ATOMIC$^{10X}$ denoised with GOLD, where the former two served as the baselines. The results are reported in Table 4 of FIG. 7. Table 4 shows zero-shot evaluation results (%) on five benchmarks for QA models trained on the original/denoised ATOMIC$^{10X}$. N/A stands for not using any denoising technique, and Avg. refers to average. It can be observed that cleaning ATOMIC$^{10X}$ with the proposed GOLD approach outperforms both baselines on average, indicating that denoising CSKGs is potentially useful for automatically generated CSKGs and that the proposed GOLD approach is superior to other noise detection frameworks on real-world CSKGs.

Experiments and Analyses—Case Study

In the present disclosure, specific case studies are presented on the mined logical rules and detected noises in the real large-scale CSKG in Appendix E.

As discussed above, a GOLD approach is provided, which is a noise detection framework leveraging the power of language models, global rules, and local structural information. This method is motivated by the fact that nodes in CSKGs are in free-text format, and correct patterns are unlikely to be drowned out by noise. Experimental results indicate that the proposed method achieves state-of-the-art performances in CSKG noise detection tasks. This method shows promising directions for automatically obtaining a large-scale CSKG with minimal noise, as well as effectively representing knowledge for downstream tasks.

APPENDICES

The following content will further supplement or explain some of the aforementioned details.

Appendix-(A): Definition of Noises in CSKG

Commonsense knowledge represents not only basic facts in traditional knowledge graphs but also the understanding possessed by most people. Therefore, a triple is evaluated as noise from two perspectives:

Truthfulness: It should be consistent with objective facts. For example, (London, IsA, city in France) is not true because London is not in France but in England.

Reasonability: It should align with logical reasoning and be consistent with cultural norms. For example, (read newspaper, MotivatedByGoal, want to eat vegetables) is not logically reasonable. The two nodes are not directly related, and there is no clear relationship between them. Another example is (hippo, AtLocation, in kitchen), which violates our understanding and experience of reality because hippos are large mammals that are highly unlikely and unrealistic to be found in a kitchen.

If a triple fails to satisfy any of the aspects mentioned above, it is defined as noise.

Appendix-(B): Experimental Setup Details

Appendix-(B.1): Datasets

ConceptNet: ConceptNet, or CN-100K contains Open Mind Common Sense (OMCS) in the ConceptNet 5 dataset. The CN-82K dataset is a uniformly sampled version of the CN-100K dataset.

ATOMIC: ATOMIC contains over 300K everyday commonsense knowledge nodes, organized as if-then relations. It proposes nine types of if-then relations to distinguish various aspects of events, such as causality, intents, and mental states. One relative work constructs a dataset from ATOMIC for the task of CSKG completion.

In the experiments of the present disclosure, CN-82K and ATOMIC are used. Unlike CSKG completion settings, the train, valid, and test splits are merged to get training and testing sets because noise detection is a ranking task requiring training and testing on the entire knowledge graph. To introduce noisy triples, noisy triples are manually added to these two datasets separately.

Specifically, the noise generated is divided into four parts, with a probability of ¼ for randomly generating a new triple $(\hat{h}, \hat{r}, \hat{t})$ where $\hat{h}, \hat{t} \in V$, $\hat{r} \in R$, and probabilities of ¼ each for modifying the head node, relation, or tail node of an existing triple. When modifying an existing triple, a ground truth triple $(\hat{h}, r, t) \in \varepsilon$ is randomly sampled from the CSKG, and one of its components is replaced with a randomly chosen node $\hat{h}, \hat{t} \in V$, or relation $\hat{r} \in R$, to create a new triple $(\hat{h}, r, t)$, $(h, \hat{r}, t)$, or $(h, r, \hat{t})$. The process of generating noisy triples ensures they do not exist in the original CSKG.

FIG. 8 shows Table 5 which is statistical information for six datasets, in which "Avg.Degree" represents the average degree of each node and "Avg. Words" represents the average number of words in the text description of each node. FIG. 9 shows Table 6 which provides examples of four manually generated types of noise. The ground truth triples modified in the examples are (hotel room, UsedFor, temporary residence) from ConceptNet and (John works long hours, xIntent, to make more money) from ATOMIC. The modified parts are indicated by underlines.

Taking (hotel room, UsedFor, temporary residence) from ConceptNet and (John works long hours, xIntent, to make more money) from ATOMIC as examples, Table 6 presents several examples of noise generated by replacing the head node, relation, and tail nodes, as well as examples of newly generated triples. These noises are still informative and theoretically challenging to detect, aligning with our previous definition of noises in CSKG in Appendix A. Hence, the noise generated through the above method is believed to be effective for model training. The statistical information for the datasets is presented in Table 5.

Appendix-(B.2): Competing Methods

The proposed GOLD approach of the present invention is compared with three categories of algorithms, beginning with four structure embedding-based methods that are unaware of noise. Here, h, r, t represent the embeddings of the head entity, relation, and tail entity, respectively.

TransE: The score function is $\|h+r-t\|$, where $h, r, t \in \mathbb{R}^d$.

DistMult: The score function is (r, h, t), where $\langle \cdot \rangle$ denotes the generalized dot product, and $h, r, t \in \mathbb{R}^d$.

ComplEx: The score function is $\Re(\langle r, h, t \rangle)$, where $h, r, t \in \mathbb{C}^d$.

RotatE: the score function is $\|h \circ r - t\|$, where $\circ$ denotes the Hadamard product, and $h, r, t \in \mathbb{C}^d$.

Next, two embedding-based methods are considered for capturing noise using local information:

1) CKRL: triple confidence and path confidence are introduced to conventional translation-based methods for knowledge representation learning.
2) CAGED: a contrastive learning framework is proposed to capture noise by aggregating triple information around the head and tail entities while also learning the traditional translation embedding.

Also, the proposed methods are evaluated against fine-tuned language models, including:

1) KG-BERT: It concatenates the triples into textual descriptions and transforms representation learning into a triplet classification problem. The performance of noise detection is evaluated using scores designed for classification.
2) LASS: It proposes a joint language semantic and structure embedding for knowledge graph completion. The scores designed for triplet classification are used to evaluate performance. This model outperforms other PLM-based methods in triplet classification tasks and is tested on four backbones: BERT-base, BERT-large, ROBERTa-base, and ROBERTa-large. Experiments are conducted on these four backbones.

Appendix-(B.3): Implementation Details

For the embedding-based baseline models, the implementation from OpenKE is used. For the rest, the released code corresponding to each paper is used to perform experiments. To align the performance of different models, the dimension of all embeddings apart from language models is set to 100, the number of negative samples to 1, and the batch size to 256. The proposed model of the present invention also follows these settings. For the remaining hyperparameters of baseline models, the settings proposed in the original paper are followed, and a grid search is performed when modifications are necessary.

Appendix-(C): Details of the Zero-shot Noise Detection

ChatGPT cannot directly sort a large number of triples, so we implement a merge sort in Algorithm 1 of FIG. 10 to sort the triples in descending order of their noise level. When comparing the order of two triples, the ASKCHATGPT function is recalled to employ ChatGPT to choose which triple is more likely to be noisy from the two triples. Inspired by chain-of-thought (CoT) prompting, ChatGPT is guided in the prompt to first provide the specific reasoning process and then is compelled to provide the answer. The prompt used for comparing which of the two triples is more likely to be noise is listed in Table 7 of FIG. 11.

Appendix-(D): Full Results of Ablation Study

In this part, a comprehensive supplementary ablation study is provided. The results of all experiments conducted on the six datasets are listed in Table 8 of FIG. 12. Table 8 is the comprehensive ablation study results comparing the impact of each component on the results on all six datasets. Additionally, the effect of adding the translation-based energy function is verified on the results.

Appendix-(D): Full Results of Ablation Study-Influence of Language Model

By removing the PLM from the triple encoder, it is observed that an average decrease of 6.1% in accuracy on the ConceptNet series datasets and an average decrease of 9.7% on the ATOMIC series datasets. This indicates that PLM has a greater impact on the accuracy of the ATOMIC datasets, as the average number of words per node in ATOMIC is much higher than that in ConceptNet. Therefore, PLM plays a more crucial role in capturing semantic information.

Appendix-(D): Full Results of Ablation Study-Influence of Global Rule Mining

After eliminating the global rule encoder, the accuracy of the ConceptNet series and ATOMIC series datasets decreases by 3.9% and 1.6%, respectively. The provided analysis of the present disclosure suggests that the lower number of relations in the ATOMIC datasets, only 9 compared to 34 in the ConceptNet datasets, results in a significantly lower number of learnable rules compared to ConceptNet. As a result, the global rule encoder provides limited assistance in the ATOMIC datasets, and its contribution is not as significant as in the ConceptNet datasets.

Appendix-(D): Full Results of Ablation Study-Influence of Local Neighbor Learning The local neighbor learning component exhibits the highest contribution across all datasets, as evidenced by the average accuracy drops of 33.1% and 21.0% in accuracy, as well as 6.7% and 4.2% in AUC after its removal on ConceptNet series and ATOMIC series datasets, respectively. It is speculated that the reason why this component has a smaller impact on the ATOMIC datasets is still due to the limited number of relations, leading to a less diverse set of information learned from the neighboring triple information.

Appendix-(D): Full Results of Ablation Study-Influence of Translation Assumption An investigation is conducted to determine whether the model would benefit from the incorporation of a translation assumption, such as the h+r≈t relation in TransE, where h, r, and t represent the embedding of the head entity, relation, and tail entity respectively. Inspired by this, an energy function based on the translation assumption is also integrated into the approach. The energy function for the translation part is designed as follows:

$$E_{translation}(h, r, t) = \|e_h + e_r - e_t\|_2 \tag{16}$$

By adding Equation (16) to Equation (12), the obtained is a new overall energy function as follows:

$$E(h, r, t) = E_{global}(h, r, t) + \lambda E_{local}(h, r, t) + \lambda^{(t)} E_{translation}(h, r, t) \tag{17}$$

where $\lambda$ and $\lambda^{(t)}$ are both hyperparameters. A grid search is performed for them between 0.001 to 1, and the best results are reported in Table 8 of FIG. 12. The experimental results indicate that the energy function based on the translation assumption in the form of Equation (16) cannot provide significant assistance to the model. The overall impact on precision is negative, with an average decrease of 0.4%. This suggests that the proposed GOLD approach does not need to rely on such translation assumption constraints when performing the noise detection task. It can implicitly learn the relationship between nodes using the energy functions of the global and local parts.

Appendix-(E): Case Studies-Mined Logical Rules

The most frequent rules mined from the ConceptNet-N10 dataset using AMIE 3 are listed in Table 9 of FIG. 13. Table 9 provides examples of the most frequent rules mined from the ConceptNet-N10 dataset. These rules are highly interpretable and not affected by mixed-in noise, making them suitable as ground truth to validate the entire knowledge graph.

Appendix-(E): Case Studies-Detected Noise

The proposed GOLD method is applied to the ATOMIC10X dataset to examine the triples with the highest noise levels, specifically those in the top 1%. Ten specific examples that violate reasonability (see Appendix A) are listed in Table 10 of FIG. 14. Table provides example of noise detected in the ATOMIC$^{10X}$ CSKG. The results demonstrate that this method can effectively extract noise triples from a large-scale CSKG.

Figure 15:
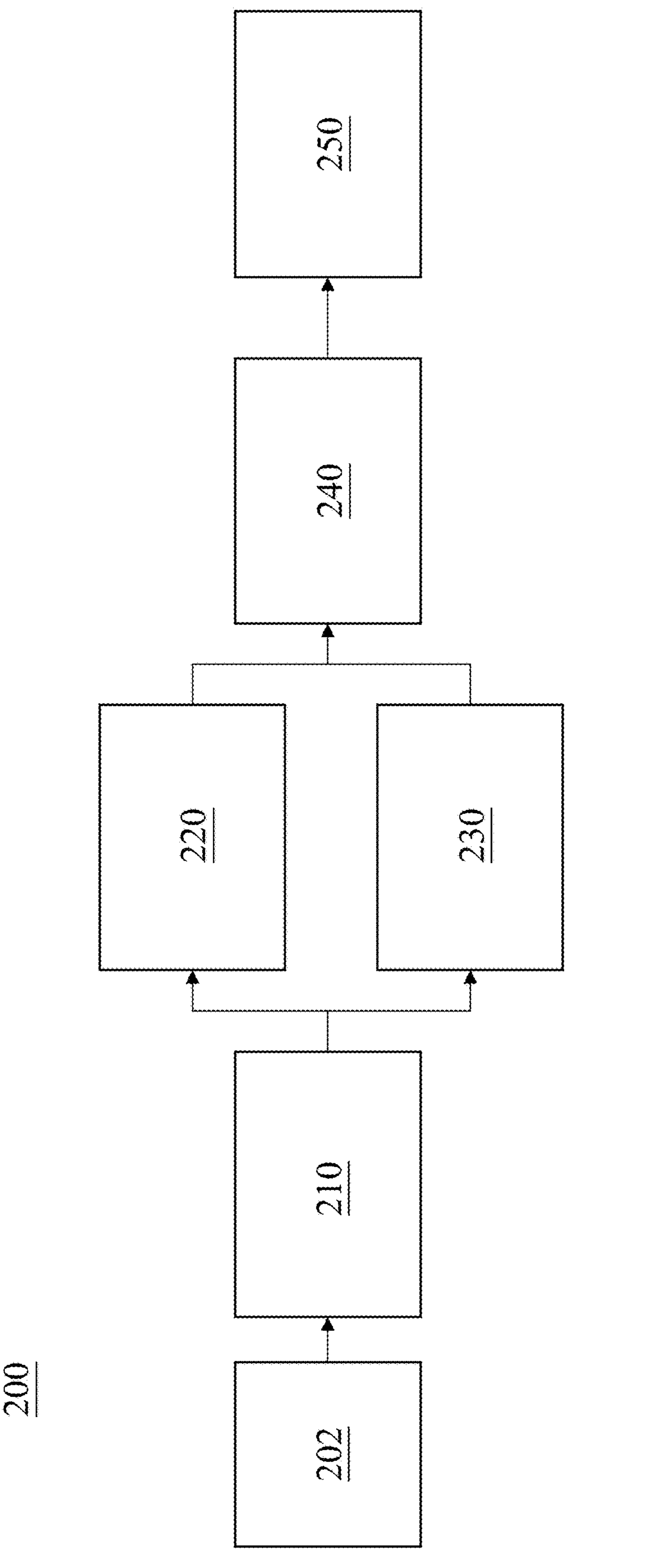
FIG. 15 depicts a schematic architecture of a system using the GOLD method according to one embodiment of the present invention.

Based on the above descriptions, the GOLD method of the present invention can provide effective comprehensive scores. Using a system with a model implementing the GOLD method will enhance performance or improve system/computer operating speed by eliminating low-scoring information. For example, FIG. 15 depicts a schematic architecture of a system 200 using the GOLD method according to one embodiment of the present invention. The system 200 includes an input receiver 202, a triple encoder 210, a global noise detector 220, a local noise detector 230, a comprehensive evaluation scorer 240, and a comprehensive score processing module 250.

The input receiver 202 serves as a user interface responsible for receiving user inputs and transmitting them, once processed, to the triple encoder 210. The input receiver 202 acts as a bridge between the user and the system 200, facilitating interaction by allowing users to input data into the system 200. The input receiver 202 is further configured to process user inputs (i.e. original input data) to ensure they meet system requirements and can be correctly interpreted and handled by the triple encoder 210. For example, the input receiver 202 can send CSKG information to the triple encoder 210 for processing and extraction.

The triple encoder 210 is configured to receive CSKG information from the input receiver 202 and extract semantic information from the free-text formatted nodes in the CSKG information. Specifically, the triple encoder 210 utilizes a PLM model (e.g., a transformer-based pretrained language model) to encode the natural language descriptions of nodes and relations within the CSKG information into sentence embeddings. The triple encoder 210 is further configured to transform the original input data into structured triples using the sentence embeddings, enabling further processing and analysis. Each structured triple consists of three parts: a head entity (subject), a relation (predicate), and a tail entity (object).

The global noise detector 220 is configured to analyze and detect noise at a global level from the CSKG information. It evaluates the likelihood of a triple being noise by examining high-level patterns and structures within the data. To identify correct patterns, the global noise detector 220 uses high-frequency patterns extracted through rule mining, which intrinsically uses a rule encoder (e.g., the rule encoder 122) to generalize the learned rules and guide noise detection. This process helps in distinguishing between genuine information and noise, ensuring the integrity and accuracy of the CSKG.

The local noise detector 230 is configured to analyze and detect noise at a local level from the CSKG information. It focuses on the immediate surroundings of each triple to identify inconsistencies or anomalies. From the local perspective, graph networks are adopted to aggregate the neighboring triple information around both the head and tail nodes of a given edge via the local noise detector 230, allowing for an estimation of any correlation. By examining the local structure and semantic relationships, the local noise detector 230 can effectively identify and filter out noise that may not be apparent from a global perspective.

In this regard, the inputs given to the global noise detector 220 and the local noise detector 230 are related to the output results of the triple encoder 210. Specifically, the main function of the triple encoder 210 is to transform natural language descriptions from the CSKG into structured triples. These structured triples contain semantic information about the head entity (subject), the relation (predicate), and the tail entity (object). This semantic information forms the foundational data for the global noise detector and the local noise detector to perform noise detection.

For the global noise detector 220, it receives the structured triples output by the triple encoder 210, identifies high-frequency patterns through rule mining, and uses a rule encoder to generalize the learned rules and guide noise detection. For local noise detector 230, it utilizes the structured triples output by the triple encoder 210 to aggregate the neighboring triple information around both the head and tail nodes via graph networks, allowing for an estimation of any correlation from a local perspective to detect noise.

The comprehensive evaluation scorer 240 is configured to provide a comprehensive score based on global noise detection and local noise detection to indicate the noise level. Specifically, the comprehensive evaluation scorer 240 takes the output results of the global noise detector 220, which include global energy information, and the output results of the local noise detector 230, which include local energy information, as its inputs.

The comprehensive score processing module 250 is configured to receive the final comprehensive scores from the comprehensive evaluation scorer 240 and includes one or more submodules. Through its internal submodules, the comprehensive score processing module 250 can perform one or more specific and practical application functions. Specifically, in various embodiments, the comprehensive score processing module 250 can include submodules as follows.

In one embodiment, the comprehensive score processing module 250 includes an automatic filtering submodule. The automatic filtering submodule is used to configure thresholds and automatically delete noise data with scores below the threshold, maintaining the quality of the knowledge graph. For example, the automatic filtering submodule can automatically filter out erroneous information identified as noise (i.e., information with a comprehensive score below the threshold after processing), thereby ensuring data accuracy and reliability.

In one embodiment, the comprehensive score processing module 250 includes a manual review submodule. The manual review submodule sends low-scoring triples to external devices for review and confirmation, enhancing system accuracy through human intervention. For example, low-scoring triples, such as "a certain drug can cure all diseases," are sent to relevant external professional institutions for review, allowing the institution to confirm whether to delete or retain the information.

In one embodiment, the comprehensive score processing module 250 includes a dynamic updating submodule. The dynamic updating submodule updates the comprehensive scores in real-time based on new data sources and rules, ensuring the system can adapt to dynamically changing data environments. For example, in a social media monitoring system, the dynamic updating submodule can update the comprehensive scores of a trending event in real-time, adjusting and cleaning noise data as more data and information flow in.

In one embodiment, the comprehensive score processing module 250 includes an enhanced model training submodule. The enhanced model training submodule trains natural language models to use only high-scoring triples during model training, improving training accuracy and reliability. For example, in natural language processing tasks, using high-scoring triples to train a chatbot model ensures the model learns from high-quality corpora, thereby improving the accuracy of its responses.

In one embodiment, the comprehensive score processing module 250 includes a quality assessment submodule. The quality assessment submodule periodically generates comprehensive score reports, evaluating the overall quality and noise level of the knowledge graph, providing references for system maintenance. For example, the quality assessment submodule can periodically generate knowledge graph quality reports, assessing the ratio of high-quality to noisy data in the graph, helping users understand how to organize and manage their data.

Through the collaborative work of these submodules, the comprehensive score processing module 250 can not only identify and clean noise data but also enhance the overall quality of the knowledge graph, optimizing various applications based on the knowledge graph. Each submodule has a clear function, ensuring the system can operate efficiently and accurately in data processing, model training, reasoning, and evaluation.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes executing in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can be included, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system using global and local-aware denoising framework for commonsense knowledge graph noise detection, comprising:

an input receiver serving as a user interface responsible for receiving user inputs and configured to process the user inputs to obtain commonsense knowledge graph (CSKG) information;

a triple encoder configured to receive the CSKG information from the input receiver and extract semantic information from free-text formatted nodes in the CSKG information, so as to obtain structured triples;

a global noise detector receiving the structured triples output from the triple encoder and configured to analyze and detect noise at a global level from the CSKG information, wherein the global noise detector identifies high-frequency patterns through rule mining and uses a rule encoder to generalize learned rules and guide noise detection;

a local noise detector receiving the structured triples output from the triple encoder and configured to analyze and detect noise at a local level from the CSKG information, wherein the local noise detector utilizes the structured triples output by the triple encoder to aggregate neighboring triple information around both the head and tail nodes via graph networks; and a comprehensive evaluation scorer configured to provide a comprehensive score based on global noise detection and local noise detection from the global noise detector and the local noise detector, respectively, to indicate a noise level for the CSKG information.

2. The system according to claim 1, wherein the triple encoder utilizes a transformer-based pretrained language model to encode natural language descriptions of nodes and relations within the CSKG information into sentence embeddings.

3. The system according to claim 2, wherein the triple encoder is further configured to transform original input data of the user inputs into the structured triples using the sentence embeddings, and each of the structured triples consists of a head entity, a relation, and a tail entity.

4. The system according to claim 1, wherein the global noise detector comprises a recurrent neural network (RNN) employed as the neutralized rule encoder.

5. The system according to claim 1, wherein the local noise detector is further configured to adopt a graph neural network to measure similarity of aggregated semantic information of the neighboring triples of the head and tail nodes using a graph attention network.

6. The system according to claim 1, wherein the comprehensive evaluation scorer is configured to take global energy information output from the global noise detector and local energy information output from the local noise detector as its inputs.

7. The system according to claim 6, further comprising:

a comprehensive score processing module configured to receive final comprehensive score information from the comprehensive evaluation scorer and perform one or more functions in response to the final comprehensive score information.

8. The system according to claim 7, wherein the comprehensive score processing module comprises an automatic filtering submodule used to configure thresholds and automatically delete noise data with scores below the threshold.

9. A method using global and local-aware denoising framework for commonsense knowledge graph noise detection, comprising:

receiving, by an input receiver serving as a user interface, user inputs to process the user inputs, so as to obtain commonsense knowledge graph (CSKG) information;

receiving, by a triple encoder, the CSKG information from the input receiver;

extracting, by the triple encoder, semantic information from free-text formatted nodes in the CSKG information, so as to obtain structured triples;

receiving, by a global noise detector, the structured triples output from the triple encoder;

analyzing and detecting, by the global noise detector, noise at a global level from the CSKG information, wherein the global noise detector identifies high-frequency patterns through rule mining and uses a rule encoder to generalize learned rules and guide noise detection;

receiving, by a local noise detector, the structured triples output from the triple encoder;

analyzing and detecting, by the local noise detector, noise at a local level from the CSKG information, wherein the local noise detector utilizes the structured triples output by the triple encoder to aggregate neighboring triple information around both the head and tail nodes via graph networks;

providing, by a comprehensive evaluation scorer, a comprehensive score based on global noise detection and local noise detection from the global noise detector and the local noise detector, respectively, so as to indicate a noise level for the CSKG information.

10. The method according to claim 9, wherein the triple encoder utilizes a transformer-based pretrained language model to encode natural language descriptions of nodes and relations within the CSKG information into sentence embeddings.

11. The method according to claim 10, further comprising:

transforming, by the triple encoder, original input data of the user inputs into the structured triples using the sentence embeddings, wherein each of the structured triples consists of a head entity, a relation, and a tail entity.

12. The method according to claim 9, wherein the global noise detector comprises a recurrent neural network (RNN) employed as the neutralized rule encoder.

13. The method according to claim 9, further comprising:

adopting, by the local noise detector, a graph neural network to measure similarity of aggregated semantic information of the neighboring triples of the head and tail nodes using a graph attention network.

14. The method according to claim 9, further comprising:

taking, by the comprehensive evaluation scorer, global energy information output from the global noise detector and local energy information output from the local noise detector as its inputs.

15. The method according to claim 14, further comprising:

receiving, by a comprehensive score processing module, final comprehensive score information from the comprehensive evaluation scorer; and performing, by the comprehensive score processing module, one or more functions in response to the final comprehensive score information.

16. The method according to claim 15, wherein the comprehensive score processing module comprises an automatic filtering submodule used to configure thresholds and automatically delete noise data with scores below the threshold.

* * * * *